United States Patent
Jang

[11] Patent Number: 5,395,410
[45] Date of Patent: Mar. 7, 1995

[54] FUME EXHAUSTER

[76] Inventor: Sun-Sing Jang, 650, Yuan-Huan E. Road, Fong-Yuan, Taichung, Taiwan, Prov. of China

[21] Appl. No.: 170,856

[22] Filed: Dec. 21, 1993

[51] Int. Cl.⁶ .............................................. B01D 46/02
[52] U.S. Cl. ........................................ 55/471; 55/472; 55/DIG. 29; 55/DIG 36; 126/299 D; 454/67; 454/189
[58] Field of Search ............... 55/385.2, 471, 472, 55/DIG. 29, DIG. 36; 126/299 D; 454/66, 67, 188, 189

[56] References Cited

U.S. PATENT DOCUMENTS

| | | | |
|---|---|---|---|
| 3,023,688 | 3/1962 | Kramer | 454/189 X |
| 3,726,203 | 4/1973 | Lindestrom | 454/189 |
| 3,776,121 | 12/1973 | Truhan | 55/DIG. 29 X |
| 4,450,756 | 5/1984 | Kling | 55/DIG. 36 X |
| 5,192,348 | 3/1993 | Ludwig | 55/385.2 |
| 5,268,012 | 12/1993 | Jang | 55/471 |

*Primary Examiner*—Charles S. Bushey
*Attorney, Agent, or Firm*—Browdy and Neimark

[57] ABSTRACT

An improved fume exhauster includes a housing forming therein a receiving space in which a suction and filtration unit is disposed. Fastened to the lower portion of the receiving space of the housing is a bottom plate having a fume sucking hole and a plurality of air exit holes arranged at a predetermined interval along left, right and front edges thereof. The fume is sucked in through the fume sucking hole of the bottom plate and is subsequently filtered by a filtration member. The filtered fume (clean air) is caused to pass through the air exit holes to form an air curtain under the fume exhauster. The air curtain acts to prevent the dissipation of the fume so as to reinforce the sucking and exhausting effect of the fume exhauster.

2 Claims, 6 Drawing Sheets

FUME EXHAUSTER

BACKGROUND OF THE INVENTION

The conventional fume exhauster has a housing provided at the top thereof with an air exhausting pipe through which the fume is let out. Such a setup of exhausting the fume is by no means satisfactory from the standpoint of environmental protection in view of the fact that the fume so exhausted can cause air pollution. With a view to overcoming the drawback of the conventional fume exhauster described above, the inventor of the present ivention disclosed an improved fume exhauster in the U.S. patent application Ser. No. 08/010,875 which was issued as U.S. Pat. No. 5,268,012 on Dec. 7, 1993. In the course of manufacturing and marketing the recently patented fume exhauster mentioned above, it occured to the inventor of the present invention that the filtered air in the fume exhauster should not be let out directly into the atmosphere and can be in fact used to enhance the effect of sucking and exhausting fume by the fume exhauster.

SUMMARY OF THE INVENTION

It is, therefore, the primary objective of the present invention to a fume exhauster with a bottom portion capable of causing the filtered air to form therein a shapeless air curtain so as to enhance the effect of sucking and exhausting the fume by the fume exhauster.

In keeping with the principle of the present invention, the foregoing objective of the present invention is attained by an improved fume exhauster comprising a housing forming therein a receiving space and a suction and filtration unit disposed in the receiving space of the housing. Disposed in the lower portion of the receiving space of the housing is a bottom plate having a fume sucking hole and a plurality of air exit holes arranged at a predetermined interval along left, right and front edges thereof. The fume is sucked in through the fume sucking hole of the bottom plate and is subsequently filtered by a filtration member. The filtered air is caused to pass through the air exit holes to form a formless air curtain under the bottom portion of the fume exhauster. The air curtain serves as a shield preventing the dissipation of the fume heat, so as to reinforce the sucking and exhausting effect of the fume exhauster.

DETAILED DESCRIPTION OF THE INVENTION

Figure 1:
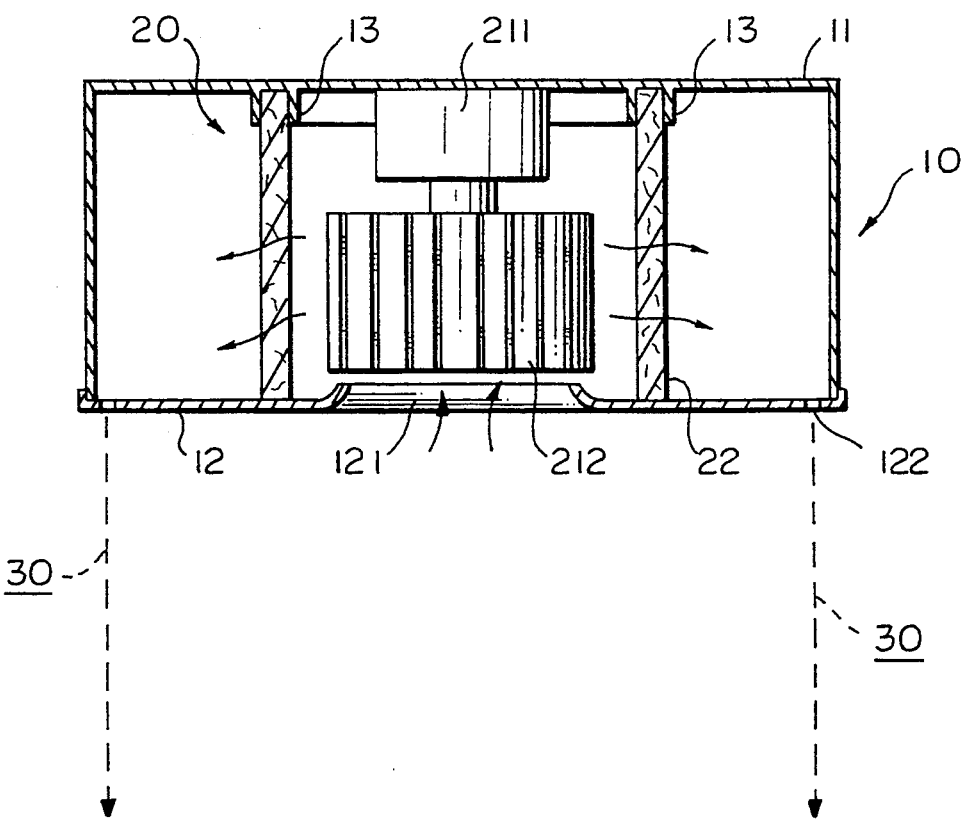
FIG. 1 shows a sectional schematic view taken in the left-right direction of a first preferred embodiment of the present invention.
Figure 2:
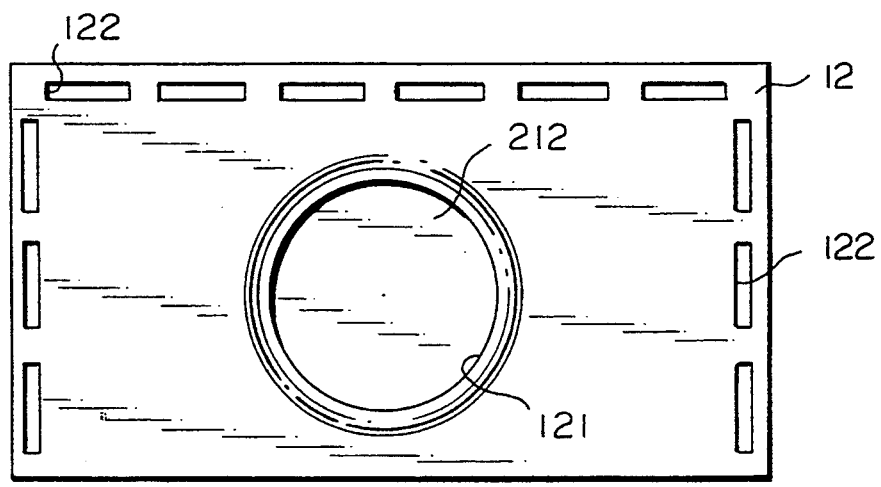
FIG. 2 shows a bottom plan view of the first preferred embodiment of the present invention as shown in FIG. 1.
Figure 3:
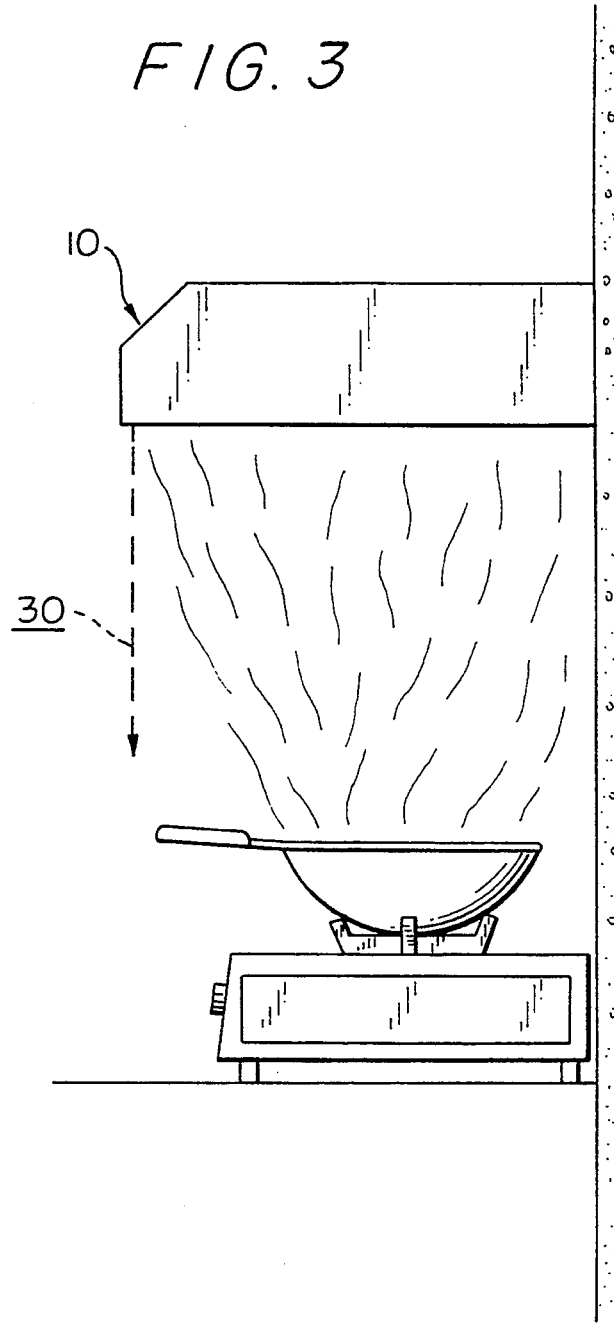
FIG. 3 shows a side elevational view of the first preferred embodiment in use, according to the present invention.

As shown in FIGS. 1–3, the present invention comprises mainly a housing 10 and a fume suction and filtration unit 20.

The housing 10 is composed of a cover 11 and a bottom plate 12. Fastened to the underside of the top plate of the cover body 11 are two double collar seats 13. The bottom plate 12 is used to seal off the bottom portion of the cover 11 and provided with a fume sucking hole 121.

The suction and filtration unit 20 comprises a sucking device 21 made up of a driving motor 211 and an impeller 212. The driving motor 211 is fastened securely to the underside of the top plate of the cover body 11. The impeller 212 is mounted on the shaft of the motor 211. The suction and filtration unit 20 further comprises a filtration member 22 of hollow cylindrical construction. The filtration member 22 has a top end fitted into the double collar seat 13 of the cover body 11 and a bottom end urging securely the bottom plate 12.

The present invention is characterized in that the bottom plate 12 is provided with a plurality of air exit holes 122 which are arranged at a predetermined interval along left, right and front edges of the bottom plate 12. The fume is sucked through the fume sucking hole 121 of the bottom plate 12 by the sucking device 21 and is then filtered by means of the filtration member 22 to become clean air, As a result, the interior of the housing 10 is quickly filled with the clean air, which is then allowed to flow downwards to pass through the air exit holes 122 of the bottom plate 12 to form a formless air curtain 30 right under the fume exhauster so as to , keep the fume within the confines of the air curtain 30, as illustrated in FIG. 3. In other words, the air curtain 30 serves to reinforce the exhausting effect of the fume exhauster of the present invention by preventing the dissipation of the fume.

The air exit holes 122 of the first preferred embodiment described above are oblong, rectangular, circular, or square in shape.

Figure 4:
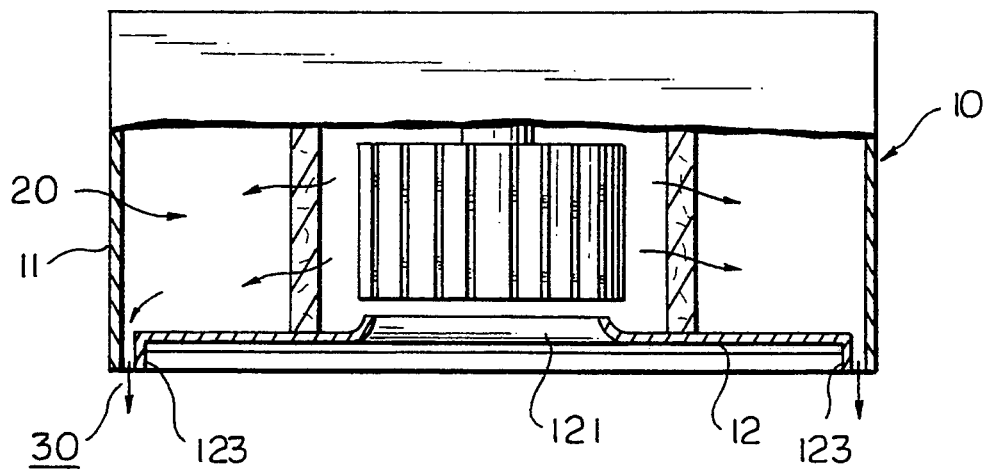
FIG. 4 shows a sectional schematic view taken along the left-right direction of a second preferred embodiment of the present Invention.
Figure 5:
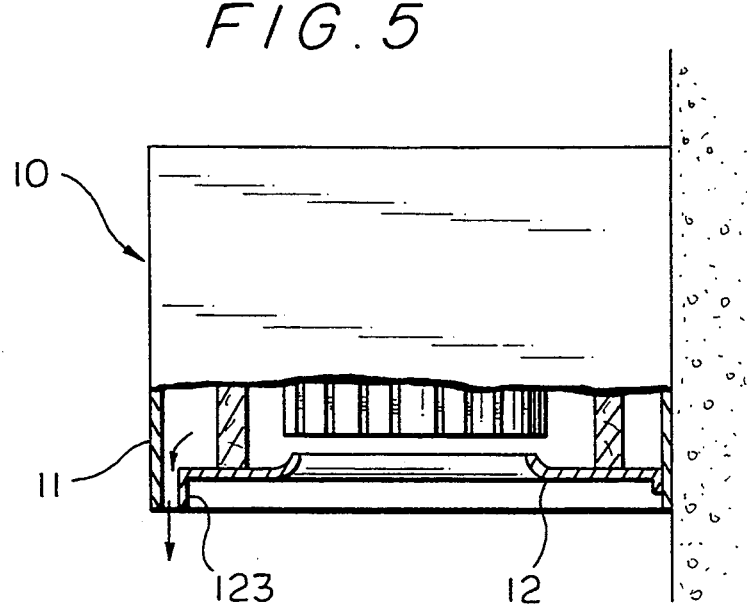
FIG. 5 shows a sectional schematic view taken along the front-rear direction of the second preferred embodiment of the present invention.

As shown in FIGS. 4 and 5, the second preferred embodiment of the present invention is different from the first preferred embodiment of the present invention in that the former is provided with the bottom plate 12 having a rear edge, which is fastened to the lower segment of the inner wall of the back plate of the cover body 11, and having left, right and front edges which extend respectively downwards to form a folded edge 123. The left, right and front folded edge 123 are kept respectively a predetermined distance from the inner walls of left, right and front plates of the cover body 11, so as to facilitate the downward passage of the filtered fume (clean air).

Figure 6:
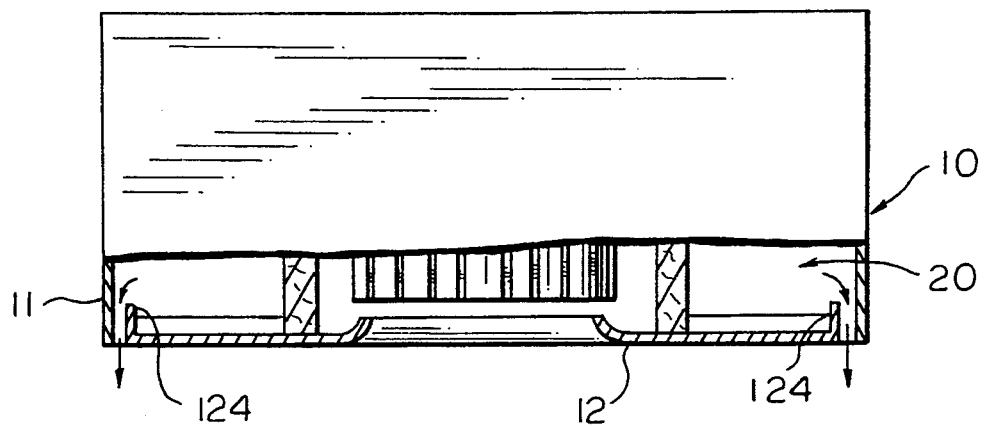
FIG. 6 shows a sectional schematic view taken along the left-right direction of a third preferred embodiment of the present invention.
Figure 7:
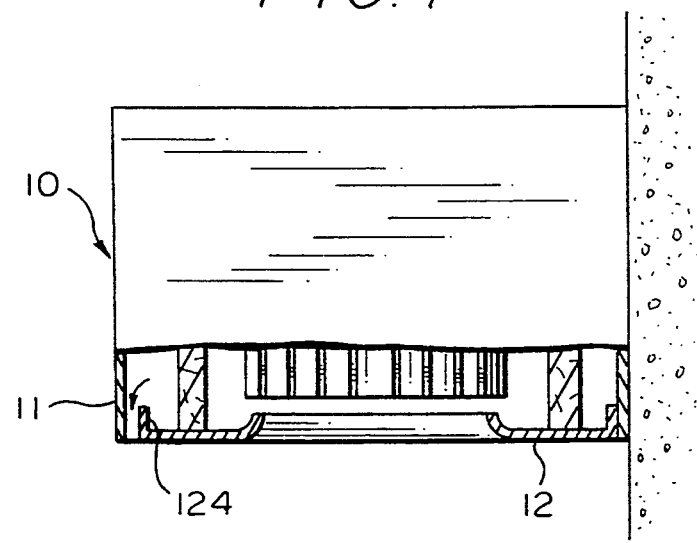
FIG. 7 shows a sectional schematic view taken along the front-rear direction of the third preferred embodiment of the present invention.

The third preferred embodiment of the present invention, as illustrated in FIGS. 6 and 7, is different from the second preferred embodiment of the present invention in that the former is provided with the bottom plate 12 having left, right and front edges, each of which extends upward to form a folded edge 124.

Figure 8:
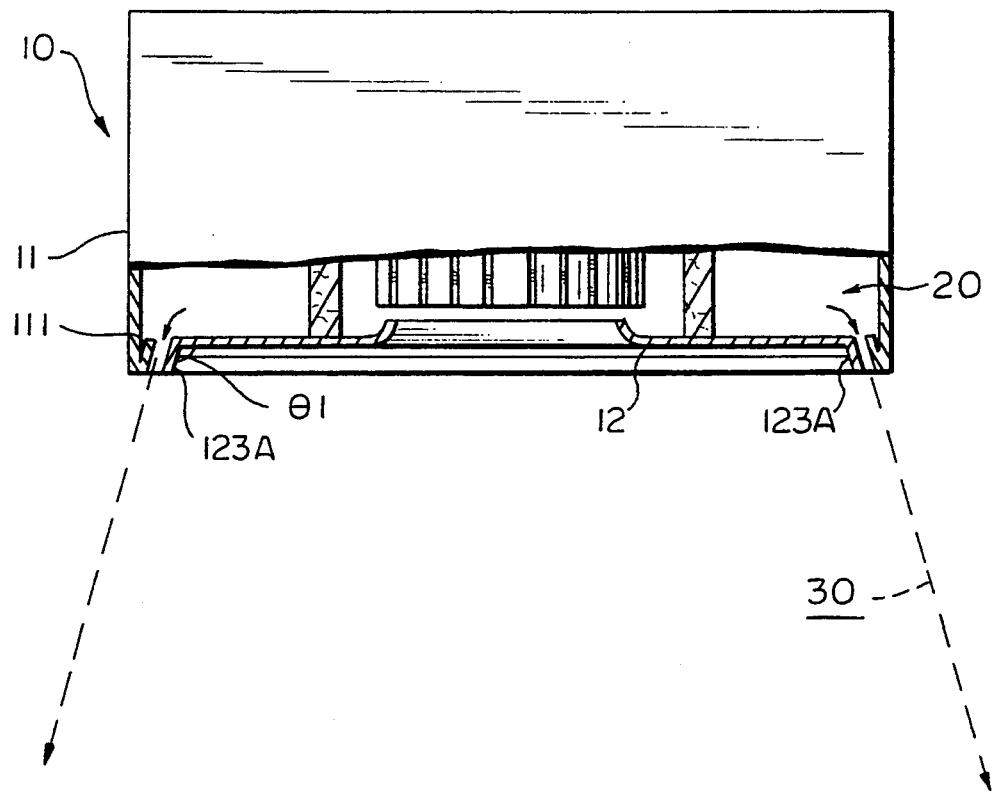
FIG. 8 shows a sectional schematic view taken along the left-right direction of a fourth preferred embodiment of the present invention.
Figure 9:
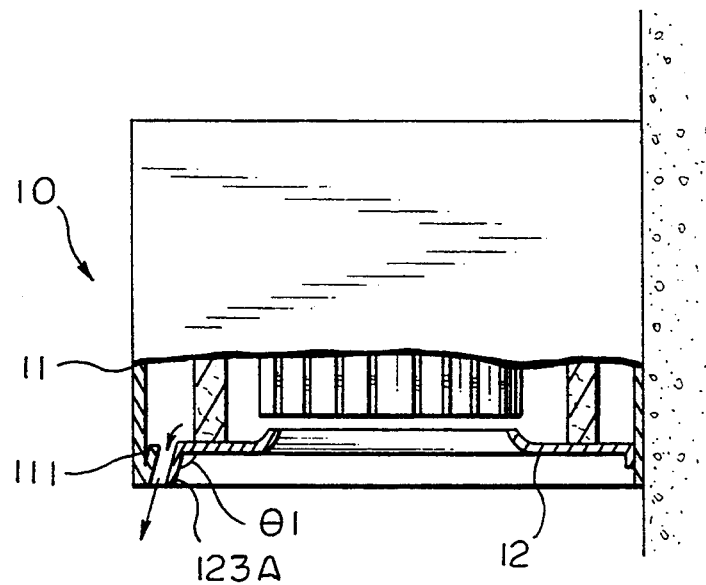
FIG. 9 shows a sectional schematic view taken along the front-rear direction of the fourth preferred embodiment of the present invention.

The fourth preferred embodiment of the present invention, as shown in FIGS. 8 and 9, differs from the second preferred embodiment in that the former is provided with the bottom plate 12 having left, right and front folded edges 123A, each of which has an outer surface forming an obtuse angle $\theta 1$ of an appropriate shape with the underside of the bottom plate 12. In addition, the fourth preferred embodiment of the present invention is provided with the cover body 11 made up of left, right and front plates, each of which has a bottom edge extending inwardly, upwardly and slantingly to form a guide plate 11.1 parallel to the folded edge 123A. As a result, the air curtain 30 can be formed such that the confine of the air curtain 30 are permitted to expand downwards progressively so as to become more effective in preventing the dissipation of the fume, as shown in FIG. 8.

Figure 10:
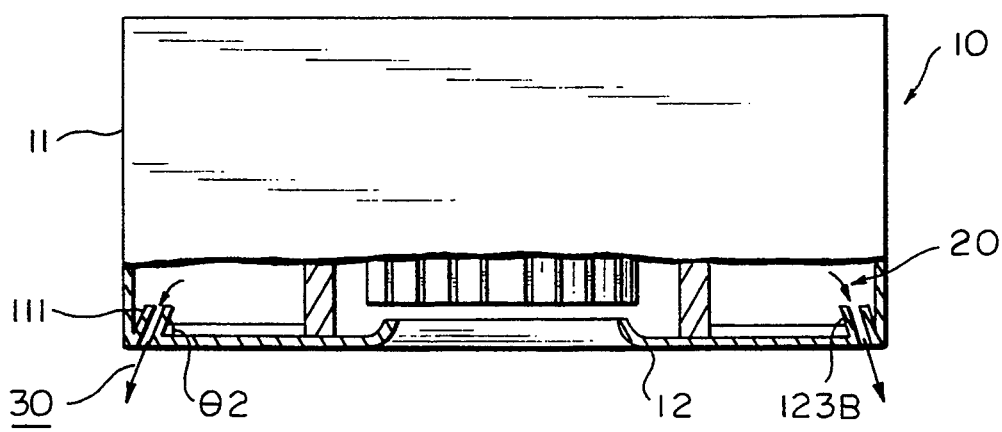
FIG. 10 shows a sectional schematic view taken along the left-right direction of a fifth preferred embodiment of the present invention.
Figure 11:
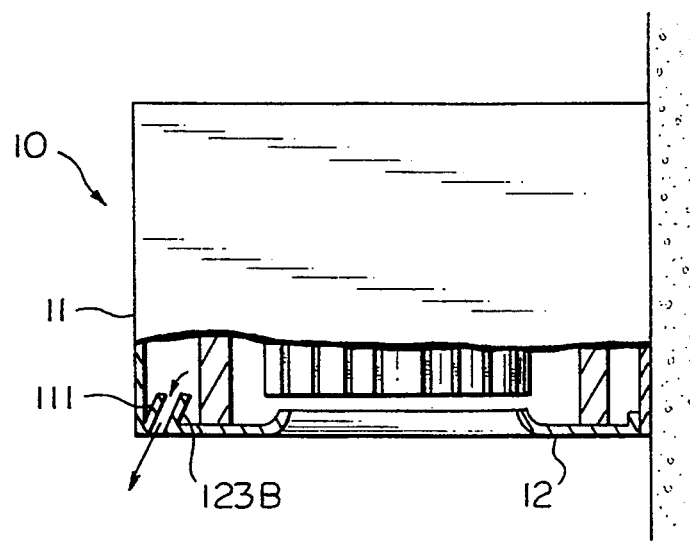
FIG. 11 shows a sectional schematic view taken along the front-rear direction of the fifth preferred embodiment of the fifth preferred embodiment of the present invention.

The fifth preferred embodiment of the present invention, which is illustrated in FIGS. 10 and 11, is different from the fourth preferred embodiment of the present invention in that the former is provided with the bottom plate 12 having left, right and front folded edges 123B, each of which extends upwardly and slantingly such that the inner wall surface of each of the folded edges 123B forms an acute angle $\theta 2$ with the upper surface of the bottom plate 12.

What is claimed is:

1. An improved fume exhauster comprising:

a housing made up of a cover body and a bottom plate, which form a receiving space in said housing, said bottom plate having at least one fume sucking hole; and a fume sucking and filtering unit mounted securely in said receiving space of said housing;

wherein said bottom plate has a rear edge fastened securely to an inner wall of a back plate of said cover body of said housing, said bottom plate further having a left edge, a right edge and a front edge, each of which extends downwards to form a folded edge which is spaced a predetermined distance respectively from inner walls of a left plate, a right and a front plate of said cover body of said housing to form an opening which produces a curtain of air from air exhausted through said filtering unit, wherein said folded edge has an outer surface forming with an underside of said bottom plate an obtuse angle; and wherein each of said left plate, said right plate and said front plate of said cover body of said housing has a bottom edge extending inwardly, upwardly and slantingly to form a guide plate parallel to and opposite in location to said folded edge;

wherein said curtain of air diverges outward from said fume exhauster.

2. An improved fume exhauster comprising:

a housing made up of a cover body and a bottom plate, which form a receiving space in said housing, said bottom plate having at least one fume sucking hole; and a fume sucking and filtering unit mounted securely in said receiving space of said housing;

wherein said bottom plate has a rear edge fastened securely to an inner wall of a back plate of said cover body of said housing, said bottom plate further having a left edge, a right edge and a front edge, each of which extends upwards to form a folded edge which is spaced a predetermined distance respectively from inner walls of a left plate, a right and a front plate of said cover body of said housing to form an opening which produces a curtain of air from air exhausted through said filtering unit, wherein said each folded edge of said bottom plate has an inner wall surface forming with an upper surface of said bottom plate an acute angle;

and wherein each of said left plate, said right plate and said front plate of said cover body of said housing has a bottom edge extending inwardly, upwardly and slantingly to form a guide plate parallel to and opposite in to location to said folded edge, wherein said curtain of air diverges outward from said fume exhauster.

* * * * *